United States Patent
Patra et al.

(10) Patent No.: US 12,067,414 B2
(45) Date of Patent: Aug. 20, 2024

(54) DATA SWAP PREVENTION IN DISTRIBUTED COMPUTING ENVIRONMENTS BASED ON MAPPING AMONG GLOBAL USER IDENTIFICATION, CORRELATION IDENTIFICATION AND THREAD IDENTIFICATION

(71) Applicant: INTERNATIONAL BUSINESS MACHINES CORPORATION, Armonk, NY (US)

(72) Inventors: Abhay Kumar Patra, Pune (IN); Rakesh Shinde, Pune (IN); Harish Bharti, Pune (IN); Vijay Ekambaram, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 169 days.

(21) Appl. No.: 17/518,932

(22) Filed: Nov. 4, 2021

(65) Prior Publication Data
US 2023/0139759 A1 May 4, 2023

(51) Int. Cl.
*G06F 9/46* (2006.01)
*G06F 9/30* (2018.01)
*G06F 9/50* (2006.01)

(52) U.S. Cl.
CPC ............ *G06F 9/466* (2013.01); *G06F 9/3009* (2013.01); *G06F 9/5033* (2013.01); *G06F 9/5083* (2013.01)

(58) Field of Classification Search
None
See application file for complete search history.

(56) References Cited

U.S. PATENT DOCUMENTS

| | | | | |
|---|---|---|---|---|
| 10,581,781 | B1* | 3/2020 | Newstadt | H04L 51/212 |
| 10,635,513 | B1* | 4/2020 | Vadaparty | G06Q 20/389 |
| 2003/0191709 | A1* | 10/2003 | Elston | G06Q 20/04 |
| | | | | 705/40 |

(Continued)

FOREIGN PATENT DOCUMENTS

| | | |
|---|---|---|
| CN | 107403107 A | 11/2017 |
| CN | 113126996 A | 7/2021 |
| CN | 113574843 A | 10/2021 |

OTHER PUBLICATIONS

International Search Report issued in corresponding PCT Application Serial No. PCT/IB2022/059807 dated Jan. 28, 2023, 3 pgs.

(Continued)

*Primary Examiner* — Meng Ai T An
*Assistant Examiner* — Zujia Xu
(74) *Attorney, Agent, or Firm* — Tutunjian & Bitetto, P.C.; Michael A. Petrocelli

(57) ABSTRACT

Inadvertent data swaps can be prevented by measuring volume of transactions in distributed computing environment to determine locations for potential data swaps; and managing a correlation between a thread identification (ID) and transaction header (ID) for transactions in the distributed computing environment. In some embodiments, the prevention of data swaps can further include performing a data transmission interruption to avoid data swaps at the locations for potential data swaps. When the thread identification (ID) and transaction header (ID) do not match the potential for data swaps can be high.

20 Claims, 7 Drawing Sheets

(56) References Cited

U.S. PATENT DOCUMENTS

| | | | | |
|---|---|---|---|---|
| 2006/0233349 A1* | 10/2006 | Cooper | ............... | H04M 3/5175 |
| | | | | 379/265.06 |
| 2010/0028650 A1* | 2/2010 | Kusakawa | ............. | C08G 18/10 |
| | | | | 428/221 |
| 2012/0170470 A1* | 7/2012 | Duchenay | ............. | H04L 61/106 |
| | | | | 370/252 |
| 2012/0260341 A1 | 10/2012 | Chan et al. | | |
| 2013/0212279 A1* | 8/2013 | Dutta | ................... | G06F 9/5077 |
| | | | | 709/226 |
| 2014/0040444 A1* | 2/2014 | Lee | ..................... | H04L 41/0806 |
| | | | | 709/222 |
| 2015/0312810 A1* | 10/2015 | Yasuda | ................. | H04W 36/08 |
| | | | | 370/338 |
| 2017/0041296 A1 | 2/2017 | Ford | | |
| 2018/0218173 A1 | 8/2018 | Perkins | | |
| 2018/0254962 A1 | 9/2018 | Goyal | | |
| 2018/0288051 A1 | 10/2018 | Hockings et al. | | |
| 2019/0130407 A1* | 5/2019 | Adjaoute | ............. | G06Q 20/384 |

OTHER PUBLICATIONS

Mell, Peter, et al., "The NIST Definition of Cloud Computing," Sep. 2011, 7 pages.

More, Mr. Pranav R., "A Framework for Secure Data Sharing in Cloud Computing using RS-IBE Mechanism," International Journal of Management, Technology and Engineering, Jun. 2018, 5 pages, 8, VI.

Priebe, Christian, et al., "Cloudsafetynet: Detecting data leakage between cloud tenants," Proceedings of the 6th edition of the ACM Workshop on Cloud Computing Security, Nov. 2014, pp. 117-128.

Thakur, Anandita Singh, et al., "Framework to improve data integrity in multi cloud environment," International Journal of Computer Applications, Feb. 2014, 6 pages, 87, 10.

Anonymous, "Leakage Resilent Could Storage," https://ip.com/IPCOM/000211368, Sep. 2011, 6 pages.

Yadav, Arun Kumar, et al., "Security solution to prevent data leakage over multitenant cloud infrastructure," International Journal of Pure and Applied Mathematics, Jan. 2018, pp. 269-276, 118.7.

\* cited by examiner

DATA SWAP PREVENTION IN DISTRIBUTED COMPUTING ENVIRONMENTS BASED ON MAPPING AMONG GLOBAL USER IDENTIFICATION, CORRELATION IDENTIFICATION AND THREAD IDENTIFICATION

BACKGROUND

The present disclosure generally relates to data management, and more particularly to avoiding the incidence of data swaps.

Banks and similar organizations can loose their position in market due to single data breach incidents. Existing security and data privacy products have difficulty addressing the problem of accidental data swaps or transaction integrity issues. Broadly described, a data swap is the problem of visibility of one user data or transaction to other user(s). This potentially occurs in a high user volumetric, concurrent transactions and multi-threaded system environments. Testing of data swaps and transaction integrity is difficult. It can be difficult to perform a wide range of functional validations test with concurrent users and realistic workloads.

SUMMARY

In accordance with one aspect of the present disclosure, a computer-implemented method is described for preventing inadvertent data swaps. In one embodiment, the method may include measuring the volume of transactions in a distributed computing environment to determine locations for potential data swaps; and managing a correlation between a thread identification (ID) and transaction header (ID) for transactions in the distributed computing environment. The method may further include performing a data transmission interruption to avoid data swaps at the locations for potential data swaps, when the thread identification (ID) and transaction header (ID) do not match.

In another aspect, a system is described for preventing inadvertent data swaps. The system may include a hardware processor; and a memory that stores a computer program product. The computer program produce when executed by the hardware processor measures the volume of transactions in distributed computing environment to determine locations for potential data swaps, and manages the correlation between a thread identification (ID) and transaction header (ID) for transactions in the distributed computing environment. The method may further include performing a data transmission interruption to avoid data swaps at the locations for potential data swaps, when the thread identification (ID) and transaction header (ID) do not match.

In yet a further aspect, a computer program product is provided for preventing incidence of inadvertent data swaps comprising a computer readable storage medium having computer readable program code embodied therewith, the program instructions executable by a processor to cause the processor to measure the volume of transactions in distributed computing environment to determine locations for potential data swaps. In some embodiments, the program instructions can further manage, using the processor, the correlation between a thread identification (ID) and transaction header (ID) for transactions in the distributed computing environment; and perform, using the processor, a data transmission interruption to avoid data swaps at the locations for potential data swaps, when the thread identification (ID) and transaction header (ID) do not match.

BRIEF DESCRIPTION OF THE DRAWINGS

The following description will provide details of preferred embodiments with reference to the following figures wherein.

DETAILED DESCRIPTION

The methods, systems, and computer program products described herein relate to methods and systems for preventing the incidence of data swaps. Broadly described, a data swap is the problem of visibility of one user data or transaction to other user(s). This potentially occurs in a high user volumetric, concurrent transactions and multi-threaded system environments. Hybrid cloud services continue to grow where cloud services have different security and application domains then legacy security and domain that lead to increasing the possibility of data swap incidents.

The methods, systems and computer program products that are described herein add entry and exit points in every component of the concurrent distributed enterprise systems that can auto-manage the correlation between thread identification (ID), and transaction-header identification (IDs), in a hierarchical multi-step cached indexing fashion to prevent data swaps while maintaining the end to end transaction integrity with very low latency cost. The "entry" and "exit points" of the distributed enterprise system can be collectively referred to as "transition points". The "transaction-header identification" is the transaction identifier (transaction ID), that is assigned when the transaction is started. The transaction header ID is assigned by whichever component is responsible for creating the transaction in response to a start command for the application being executed by the component. The "thread ID" is the identification of an interconnected software exchange of data that comes from integrating systems and data to create a holistic and connected data flow.

The disclosure describes a method and framework for data swap prevention that detects data swap before it occurs, provides visibility to components contributing to data swaps and provides end to end transaction integrity. High performance data swap detection is infused and injected into all layers and components of distributed application architecture wherever there is possible data/transaction exchange between components. The framework provided herein ensures data swap identification, notification and prevention in transaction context along with transaction integrity. The framework uses a multi combinatorial mechanism of detecting data swap and assurance of transaction integrity leveraging Globally Unique Identifier GUID, Optionally User Identification (ID), Thread Identification (ID), Transaction Identification (ID), correlation Identification (ID) and other security tokens. In some embodiments, the framework ensures transaction integrity and prevention of data swap through entry/exit bare minimum control in low latency transaction requirements. The methods, systems and computer program products are now described in greater detail with reference to FIGS. 1-7.

Figure 1:
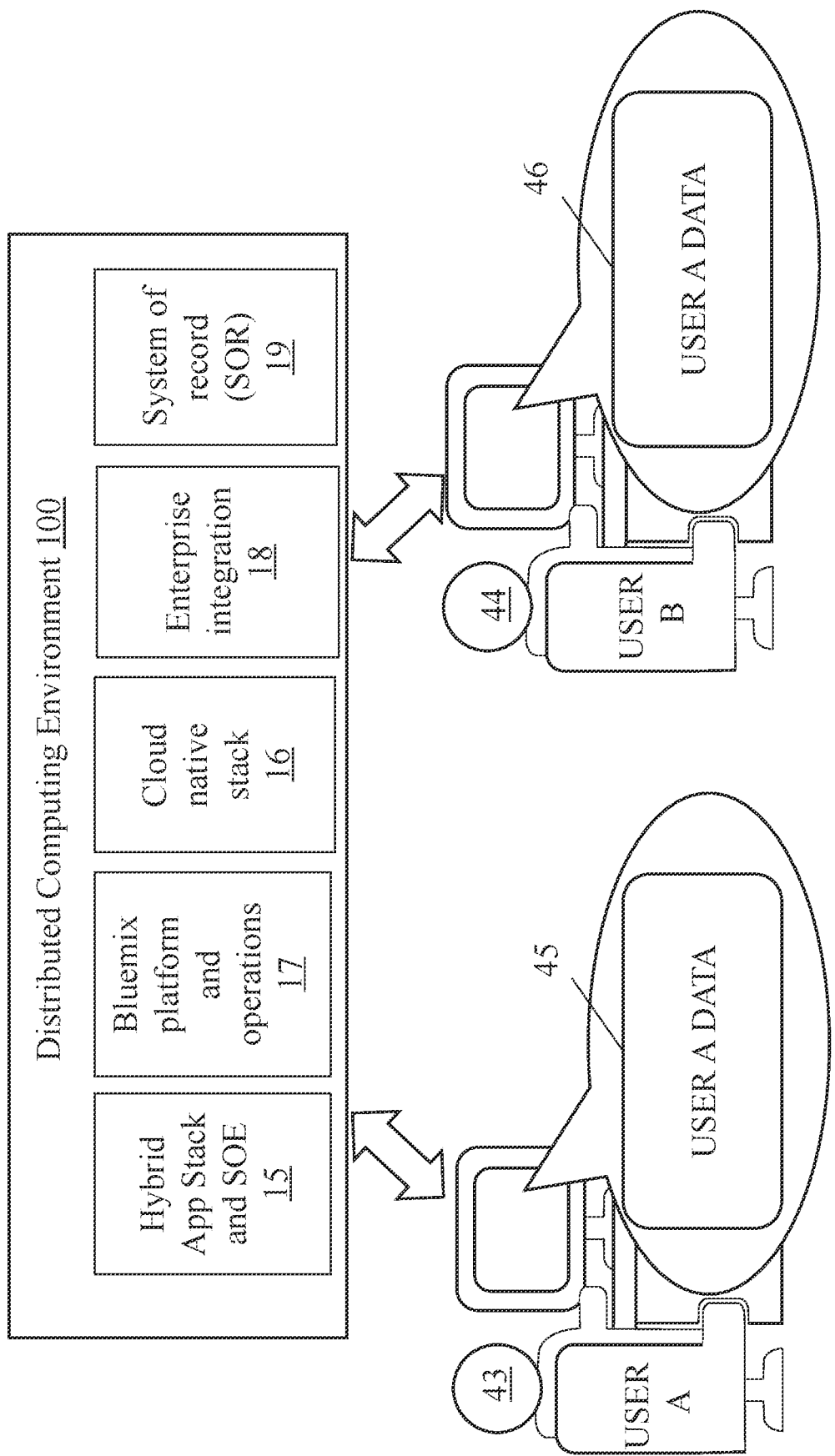
FIG. 1 is an illustration of an example environment illustrating a distributed computing application, in accordance with some embodiments of the present disclosure.
Figure 2:
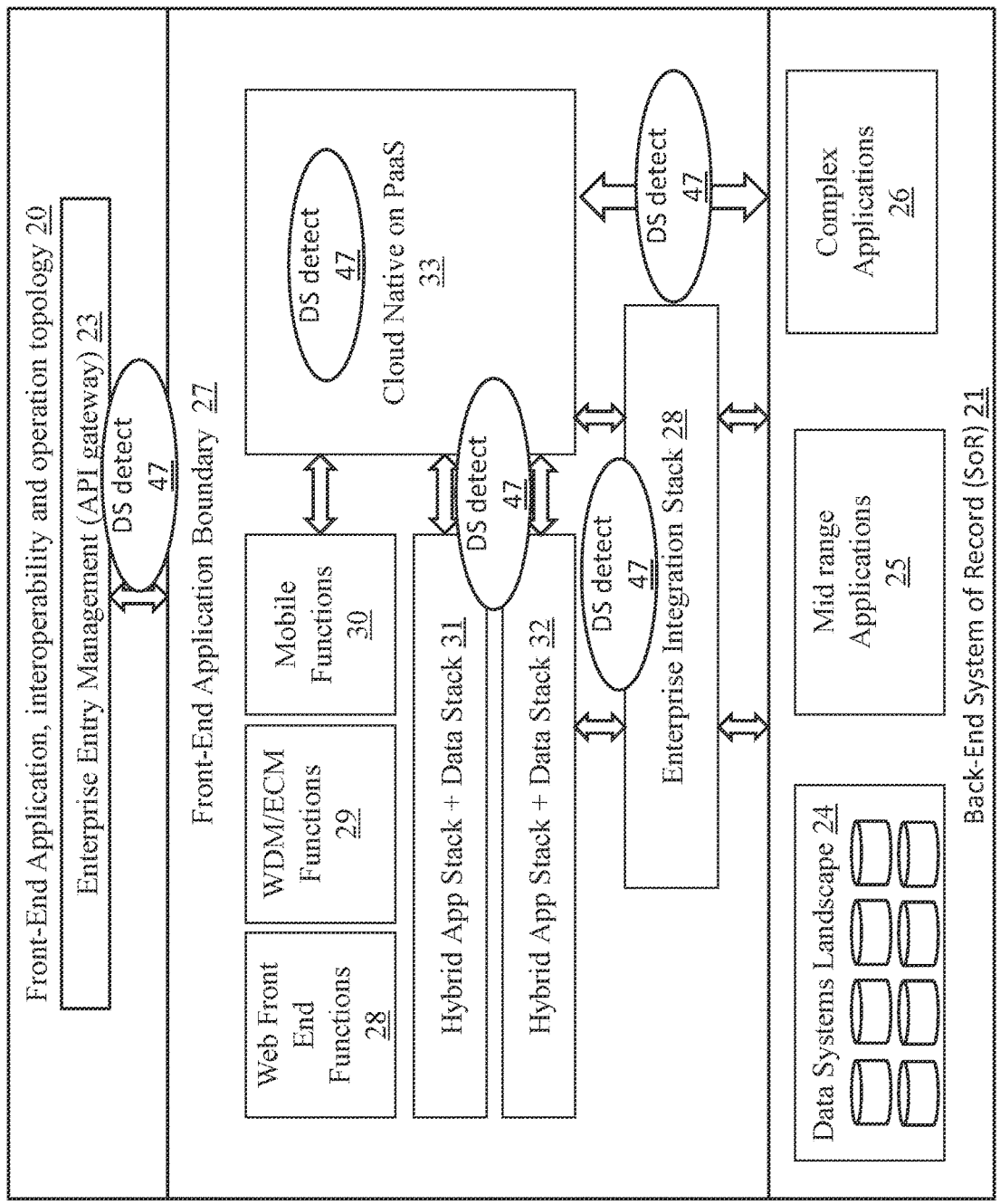
FIG. 2 is an illustration of an example hybrid cloud architecture that is being monitored to avoid the occurrence of data swaps, in accordance with one embodiment of the present disclosure.
Figure 3:
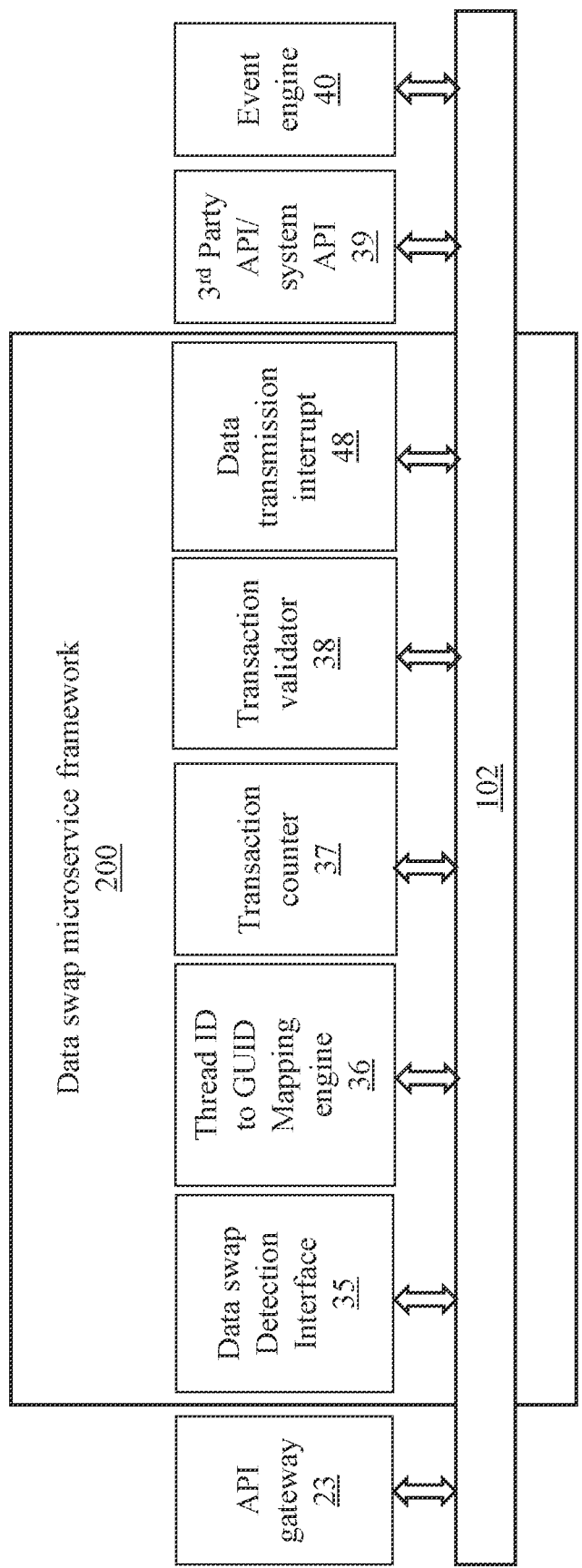
FIG. 3 is block diagram depicting one embodiment of a system for reducing data swaps, in accordance with some embodiments of the present disclosure.
Figure 4:
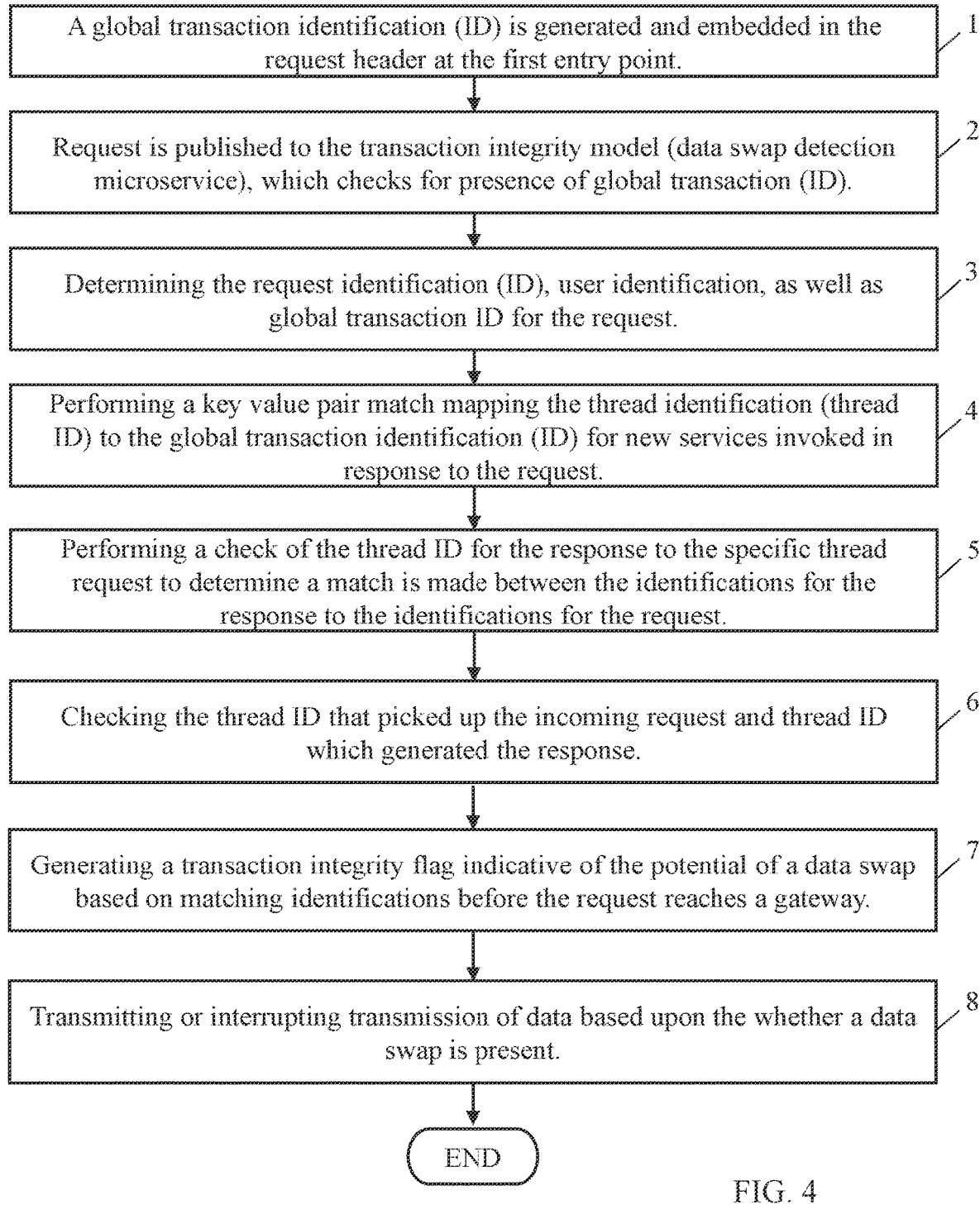
FIG. 4 is a flow/block diagram showing one embodiment a method for reducing data swaps, in accordance with some embodiments of the present disclosure.

FIGS. 1-2 are illustrations of an example environment, in which the systems and methods of the present disclosure can prevent inadvertent data swaps. FIG. 3 is an illustration of a block diagram depicting one embodiment of a system for preventing inadvertent data swaps. FIG. 4 is a flow/block diagram showing one embodiment a method for data swap prevention that detects data swaps before it occurs, provides visibility to components contributing to data swaps and provides end to end transaction integrity.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is an illustration of a distributed computing application environment, which may include cloud based elements. The distributed computing application environment may include a hybrid application stack and a system of engagement (SOE) 15, a native cloud stack 16, a cloud platform as a service (PAAS) 17, enterprise integration 18 and systems of record (SOR) 19, which each provide a different type of architecture. The elements for the different types of architectures can include synchronicity/transaction elements, and the numbers of systems of record (SOR) in interfaces involved. The elements for the different types of architectures can also include the heterogeneity of the infrastructure stack involved, and whether the architecture is non-cloud, cloud enabled and/or cloud native. The elements for the architecture can also include whether the architectural component has multiple locations as well as on premise and off premise locations. FIG. 1 further illustrates an inadvertent data swap. A first user 43 (e.g., user A) and second user 44 (e.g., user B) is depicted that are each interacting in data exchange applications with a distributed computing environment 100. As illustrated, due to the interaction with the distributed computing environment 100, the first user 43 retrieves data 45 (user A data) that is correlated correctly to the first user 43. The second user (user B) inadvertently receives the data 46 for the first user (user A data), which is the result of an inadvertent data swap. The methods, systems and computer program products of the present disclosure detect and reduce data swaps. The volume of transactions through an architectural component is another element that is considered in determining components that are likely to provide for data swap scenarios at the entry and exit points. Security in all the layers is also a factor.

FIG. 2 illustrates one embodiment of a hybrid cloud environment having multiple points for data swap potential (which is illustrated by the notation "DS detection"). The hybrid cloud environment may include a front end application, interoperability and operation topology 20, which may be hereafter referred to as the "front end application 20". The hybrid cloud environment may also include a back end system of reference (SOR) 21. Front end and back end are terms used by programmers and computer professionals to describe the layers that make up hardware, a computer program or a website which are delineated based on how accessible they are to a user. The back end refers to parts of a computer application or a program's code that allow it to operate and that cannot be accessed by a user. Most data and operating syntax are stored and accessed in the back end of a system. In some embodiments, the code is comprised of one or more programming languages. The layer above the back end is the front end and it includes all software or hardware that is part of a user interface. Human or digital users interact directly with various aspects of the front end of a program, including user-entered data, buttons, programs, websites and other features.

In some embodiments, the front end application layer 20 may include enterprise entry management layer 23. The enterprise entry management layer 23 may include a fast content delivery network (CDN), edge security, routing procedures, and an application programming interface (API). This layer may be collectively referred to as the API having reference number 23. The back end SOR 21 may include a data systems landscape 24, mid range application 25 and complex applications 26.

Still referring to FIG. 2, between the front end application layer 20 and the back end SOR 21 may include the front application boundary 27, and an enterprise integration stack 28. In one embodiment, the front office application boundary 27 can include web front end functions 28, WCM/ECM functions 29, and mobile functions 30. The front office application boundary 27 can also include a hybrid application stack and data stack 31, as well as a heterogenous platform and operations player 32, and cloud native applications 33.

Still referring to FIG. 2, every component where transaction and security context changes can be a potential hotspot for data swap. Asynchronous interfaces and multi-threaded services provide additional hotspots for accidental mix of request and response. The hotspots are designated "DS detection" having reference number 47. The notation "DS detection" notes high performance data swap (DS) detection controls being injected across the hybrid cloud landscape depicted in FIG. 2. In this example, the entry/exit is the minimum control to prevent data swap when microseconds latency is not acceptable.

FIG. 3 illustrates one embodiment of a data swap detection system framework 200 for providing data swap prevention. The framework depicted in FIG. 3 can inject co-relational identification (ID) and the global unique identifier (GUID) at the entry point, e.g., data swap microservice interface 35. The data swap microservice interface 35 can provide for connection of the microservice at each data swap detection point 47 as depicted, in which the data swap detection points 47 can provide transition points (exit and/or exit points) to the distributed computing environment. For example, the entry point can be from the API gateway 23 of the front end application 20. From the API gateway 23 to the data swap detection microservice 200, the data swap detection microservice 200 provides data swap (DS) detection by creating mapping between the thread dentification (ID) to the global unique identifier (GUID) and the correlation ID. The tread ID to GUID mapping engine 36 depicted in FIG. 3 can provide the aforementioned mapping. The framework for data swap prevention and detection depicted in FIG. 3 may be present at any data or transaction exchange interface, illustrated by the annotation DS detection in FIG. 2. Particularly, the data or transaction exchange interfaces having high volume are the likely points of data swaps, and hence would provide a suitable location for the framework for data swap prevention depicted in FIG. 3. In some embodiments, the framework that provides the data swap detection microservice 200 includes a transaction counter 37. The transaction counter 37 can track the number of transactions through a transition point, e.g., entry point or exit point, to determine when a high volume transition point is present. For example, a threshold number of transactions may be preset. When the number of transactions exceed the preset threshold for a given amount of time, that transition point where those transactions occur can be considered a point at which data swaps can occur, which is the point at which data swap detection 47 can occur. The exit policy is to match the thread identification (ID) to the global unique identifier (GUI) and the correlation identification (ID). The validator 38 can include a signal generator. The signal generator sends instructions regarding potential data swaps.

Data swap detection can be provided by data swap detection microservices 200. In one example, the microservices can be performed at the API gateway 23 for the front end application 20. This is an example as the entry of data, or requests for data, and its processing to avoid data swaps. In some embodiments, the microservices validate correlation ID and global unique identifier (GUID) are present at the API. This is one of the initial steps of detecting for a data swap. If the correlation ID and global unique identifier (GUID) are not present, than the data swap detection microservice 200 issues a flag, i.e., the microservices can throw an error code. This can be performed by the transaction validator 38.

The data swap detection microservice 200 can also validate tokens belonging to the global unique identifier (GUID). The tokens of the GUID can be validated using the JSON web token (JWT) payload. JSON Web Tokens are an open, industry standard RFC 7519 method for representing claims securely between two parties. JSON Web Token (JWT) defines a compact and self-contained way for securely transmitting information between parties as a JSON object. This information can be verified and trusted because it is digitally signed. JWTs can be signed using a secret (with the HMAC algorithm) or a public/private key pair using RSA or ECDSA. The microservice uses the correlation identification (ID) for logging/event creation.

For the data swap detection microservice 200 to be successful some assumptions are made. For example, authorization and access controls for resources being accessed are in place. In some examples, the users have a token for access to all of the resources, e.g., all of the databases from which data could be the source of a data swap. In other examples, in which user tokens are not in place to access databases, an application level user ID may be employed that ensures the data being accessed is in context with the global user identification (GUID).

The data swap detection microservice 200 can then track for data swaps to third party API/systems API 39. The microservice again validates correlation identification (ID) and global user identification (GUID) that goes out to the third party API/systems API 39, and that the correlation (ID) and GUID that goes out, comes back in. Further, the microservice ensures that the App-Transaction Id is present in incoming request and is logged. Validation can be provided by the transaction validator 38.

The framework for the data swap detection microservices 200 may also employ an event engine 40, such as KAFKA topics. Kafka is a publish-subscribe based messaging system exchanging data between processes, applications, and servers. Kafka is a software where topics can be defined (think of a topic as a category), applications can add, process and reprocess records. Applications connect to this system and transfer a record onto the topic. A record can include any kind of information; for example, information about an event that has happened on a website, or an event that is supposed to trigger an event. Another application may connect to the system and process or re-process records from a topic. The data sent is stored until a specified retention period has passed by.

From the data swap detection microservice 200 to the event engine 40, e.g., Kafka topic event engine, a determination is made to confirm co-relation identification (ID), and global unique identifier (GUID) included in the event, e.g., an event in which a data swap can occur. From the event engine 40, e.g., Kafka topic event engine, to the microservice, the microservice can validate correlation Id and that the global unique identifier (GUID) are present, or else the microservice with throw an error indication. This validation step may be performed by the transaction validator 38. As long as, the correlation ID and global unique identifier (GUID) are present and used as described below, their correct value will be validated by API gateway, or by an orchestrator for long running transactions, or any request originator.

The data swap microservice can validate that the token belongs to global unique identifier (GUID). The microservices uses the correlation identification (ID) for logging/event creation.

For the data swap prevention microservice 200 to be successful some assumptions are made. For example, authorization and access controls for resources being accessed are in place. In some examples, the users have a token for access to all of the resources, e.g., all of the databases from which data could be the source of a data swap. In other examples, in which user tokens are not in place to access databases, an application level user ID may be employed that ensures the data being accessed is in context with the global user identification (GUID).

Still referring to FIG. 3, from the event engine 40, e.g., Kafka topic, to the integration service/enterprise service bus (ESB)(System of record (SoR) wrapper web service), the enterprise service bus can ensure that the correlation identification (ID) and global user identification (GUID) that goes into the webservice for the system of record (SOR) matches what comes back. This includes the system of records (SOR) local transaction ID as App-transaction ID and logs the same. This can enable end to end traceability.

Still referring to FIG. 3, the microservices for data swap detection 200 and prevention framework includes a web service that can be integrated into the framework depicted in FIG. 2 through an integration/service bus 102. The integration service bus 1023 can provide connectivity to the data swap detection sites 47 that are depicted in FIG. 2. The web service ensures the correlation identification ID and the global unique identifier are included.

Turning to the integration server to Kafka topic, the web service ensures the correlation identification (ID) and the global unique identifier (GUID) are included. In some examples, in a legacy application, the system of record (SoR) would not directly be engaged with the events related to potential data swaps, and the back end system of record (SOR) may have a wapper webservices/API.

Turning to the system of record (SoR), no change is expected for the integration of the data swap architecture. In most cases the SOR already has a local transaction identification (ID), which is sent back to the webservice. Referring to FIG. 3, each time the data swap detection system 100 detects a data swap, e.g., the thread ID and the transaction header ID do not match, the system can send comments to interrupt data transfer to avoid the incidence of a data swap. This step can be provided by the data transmission interrupt 48.

FIG. 4 is a flow/block diagram showing one embodiment a method for reducing data swaps. At block 1, at the first entry point 5 of a request, a global transaction identification (ID) is generated and embedded in the request header. The first entry point for the request can be the application programming interface (API).

At block 2, the method may continue with the request from the application programming interface (API) gateway being published asynchronously to transaction integrity model, as it continues to back end to front end adaptors. In some embodiments, the requires meta data must contain the global transaction identification (ID) ,which is introduced by the API gateway.

At block 3, within the framework of the transaction integrity model, the method further includes determining the request identification (ID), global transaction identification (ID), user identification (ID) for the request being received in the transaction integrity model.

Referring to block 4, within the framework of the transaction integrity model, for every new service invoked, a key value pair cached match is performed mapping the thread identification (thread ID) to the global transaction identification (ID).

At block 5, within the framework of the transaction integrity model, for every new service request, from a specific thread (as identified by thread ID), a match is made to the identifications for the request that include the request identification (ID), global transaction identification (ID), user identification (ID). In some examples, the request identification (ID), the global transaction identification (ID), and the user identification (ID) are referred to as the request trio parameters.

Referring to block 6, within the framework of the transaction, a check is performed of the thread ID for the thread at which the request was picked up, and the thread ID for the thread of the component that generated the response.

At block 7, within the framework of the transaction integrity model and before the request reaches the gateway, a transaction integrity flag is generated, e.g., a flag of yes or no, based upon which gateway decides whether the transaction details are to be delivered to the consumer. A flag for transaction integrity, e.g., a flag of yes for data integrity, illustrates that there is no data swap. A flag of "yes" for the transaction integrity flag can be issued when the request trio parameters match the thread ID. A flag for no transaction integrity, e.g., a flag of no for data integrity, illustrates that there is a data swap or potential for a data swap. A flag of "no" for the transaction integrity flag can be issued when the request trio parameters do not match the thread ID.

The method may further include block 8, which is transmitting the data as part of a transaction using a distributed computing environment, when the transaction integrity flag indicates that the request trio parameters match the thread ID, which indicates that there is no data swap.

The execution model for this framework can include classify transactions into various service quality of service levels in a hierarchical tree structure. For example, transactions taking on the order of milliseconds can be considered very high, while transactions taking 0.5 to 1 second would be considered high, and 1 to 3 seconds would be considered medium, etc.

The execution model for the framework depicted in FIG. 4 can also capture and request response detailed asynchronously on an event engine, such as a Quality of Service (QoS) Kafka topic. Quality of Service (QoS) is a set of technologies that work on a network to guarantee its ability to dependably run high-priority applications and traffic under limited network capacity . . . . Measurements of concern QoS are bandwidth (throughput), latency (delay), jitter (variance in latency), and error rate.

Kafka is a publish-subscribe based messaging system exchanging data between processes, applications, and servers. Kafka is a software where topics can be defined (think of a topic as a category), applications can add, process and reprocess records. Applications connect to this system and transfer a record onto the topic. A record can include any kind of information; for example, information about an event that has happened on a website, or an event that is supposed to trigger an event. Another application may connect to the system and process or re-process records from a topic. The data sent is stored until a specified retention period has passed by.

Based on QoS Kafka topics are kept separate for each category of transactions, which decides priority of processing.

It keeps transaction profile templates ready based on static code analysis of each transaction that goes live so it has clear visibility of all services/systems this transaction can reach. It also knows which systems are mandatory to respond for the transaction to complete.

Figure 5:
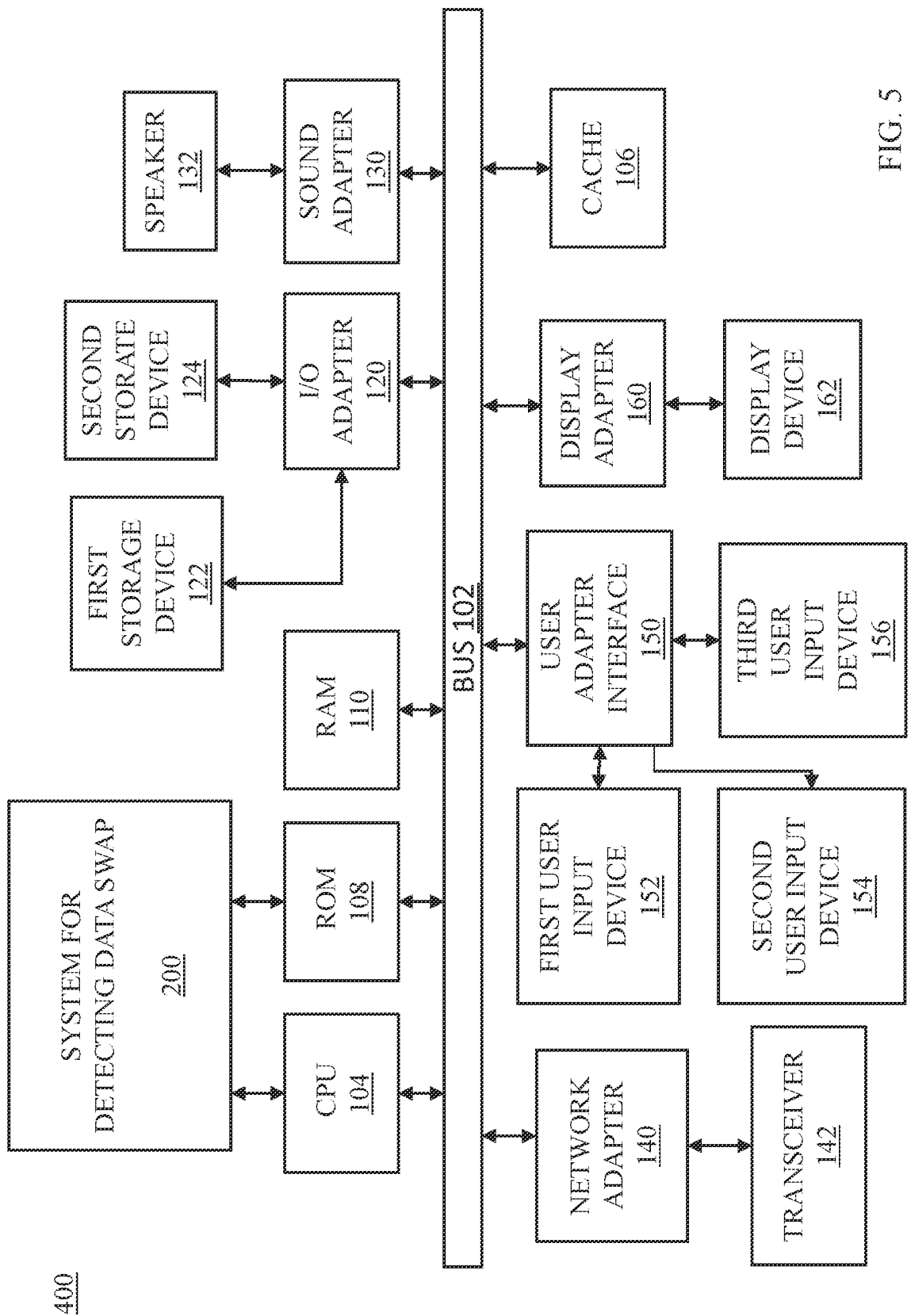
FIG. 5 is a block diagram illustrating a system that can incorporate the system for identifying the appropriate strategy for push and pull methodologies for client server calls that is depicted in FIG. 3, in accordance with one embodiment of the present disclosure.

FIG. 5 illustrates a processing system 400 used by or comprised by the system 200 of FIG. 3 for reducing the incidence of inadvertent data swaps, in accordance with the methods and systems described above in FIGS. 1-4. The bus 102 interconnects the plurality of components for the system 100 described above with the components depicted in the computer system 400 depicted in FIG. 5.

The processing system 400 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. The bus 102 interconnects a plurality of components has will be described herein.

The processing system 400 depicted in FIG. 5, may further include a first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400, which can include the system 100 for reducing cross contamination.

Of course, the processing system 400 may also include other elements (not shown), as readily contemplated by one of skill in the art, as well as omit certain elements. For example, various other input devices and/or output devices can be included in processing system 400, de pending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

While FIG. 5 shows the computer system 400 as a particular configuration of hardware and software, any configuration of hardware and software, as would be known to a person of ordinary skill in the art, may be utilized for the purposes stated supra in conjunction with the particular computer system 100 of FIG. 3. For example, the memory devices 94 and 95 may be portions of a single memory device rather than separate memory devices.

The present invention may be a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

In one embodiment, the present disclosure provides a non-transistory computer readable storage medium that includes a computer readable program for preventing inadvertent data swaps. The non-transitory computer readable program when executed on a computer causes the computer to perform the steps of measuring the volume of transactions in distributed computing environment to determine locations for potential data swaps; and managing the correlation between a thread identification (ID) and transaction header (ID) for transactions in the distributed computing environment. The computer program product can perform, using a processor, a data transmission interruption to avoid data swaps at the locations for potential data swaps, when the thread identification (ID) and transaction header (ID) do not match.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment (e.g., Internet of thing (IOT)) now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 6:
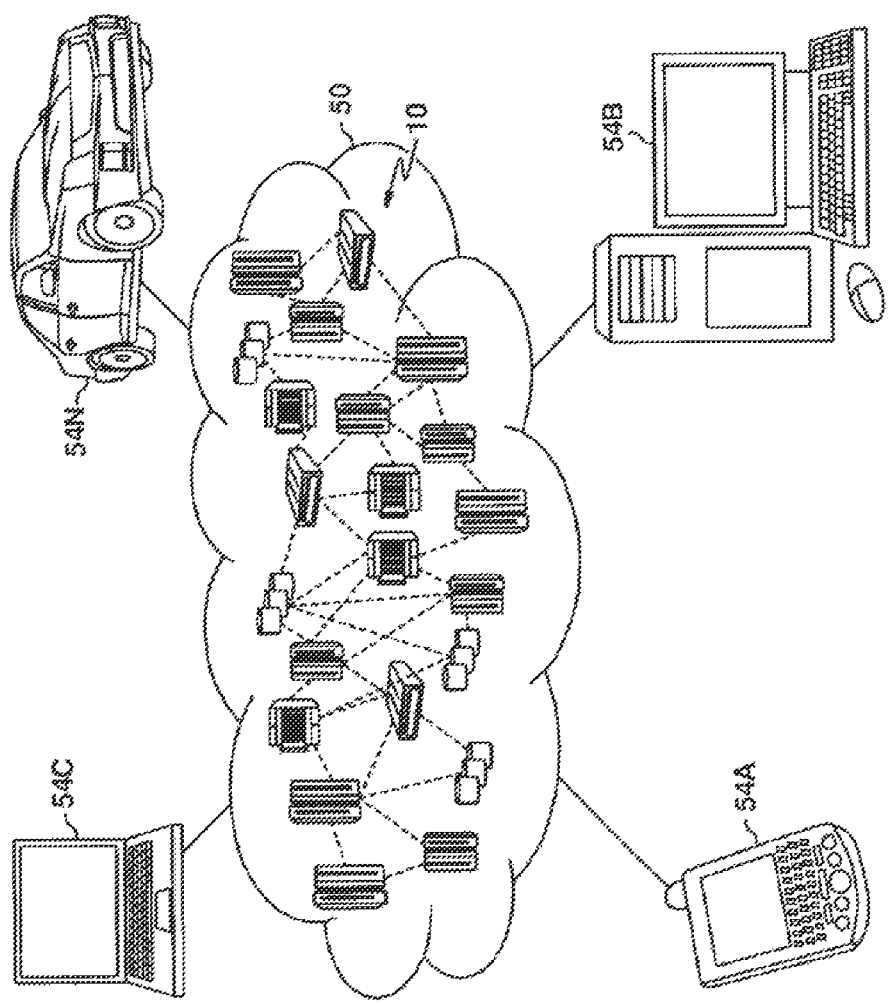
FIG. 6 depicts a cloud computing environment according to an embodiment of the present disclosure.

Referring now to FIG. 6, illustrative cloud computing environment is depicted. As shown, cloud computing environment includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Figure 7:
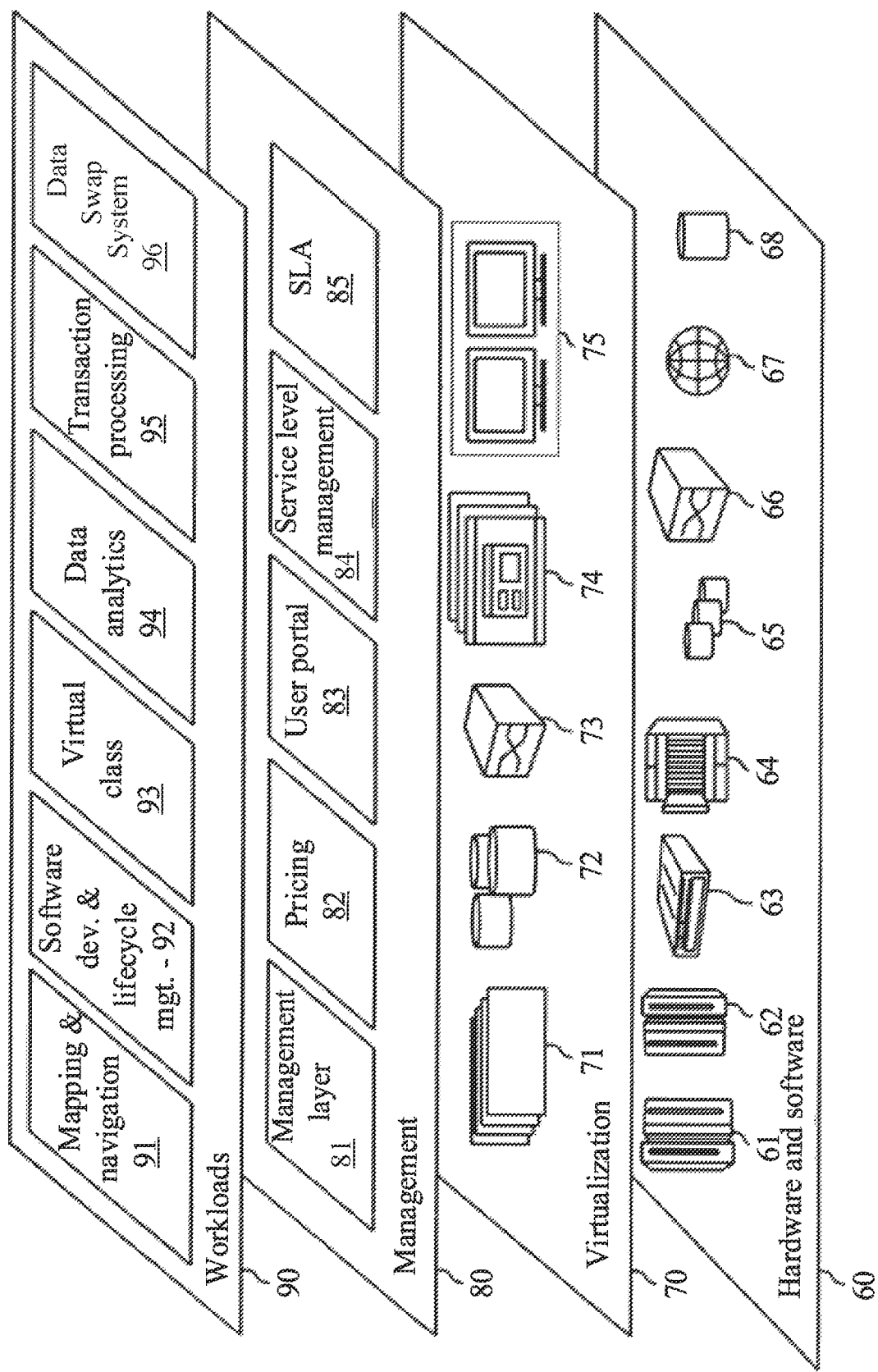
FIG. 7 depicts abstraction model layers according to an embodiment of the present disclosure.

Referring now to FIG. 7, a set of functional abstraction layers provided by cloud computing environment (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators.

Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a data swap prevention system 96 in accordance with FIGS. 1-7.

Having described preferred embodiments of a system and method for data swap prevention in distributed computing environments (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method performed by a data swap microservice framework for preventing incidence of data swaps comprising:
   measuring volumeof transactions at transition points that include entry and exit points in distributed computing environment to determine multi-level locations for potential data swaps, wherein each of the transactions has a transaction header;
   tagging the transactions with a global user identification (GUID) in the respective transaction header;
   recording the entry and exit points from the multi-level locations in the respective transaction header as correlation identifications (CID) for a thread identification (TID);
   managing a correlation between the TID and the GUID in the respective transaction header for the transactions in the distributed computing environment by mapping the GUID, the TID, and the CID; and
   performing a data transmission interruption to avoid data swaps at the multi-level locations for potential data swaps, based on an exit policy when the CID, the TID, and the GUID for the transactions in the respective transaction header do not match.

2. The computer-implemented method of claim 1, wherein a request for a transaction includes the GUID being generated and embedded in the respective transaction header.

3. The computer-implemented method of claim 1, wherein the locations for potential data swaps include the entry point and the exit point for the transaction that automatically checks for matching between the TID and the GUID in the respective transaction header.

4. The computer-implemented method of claim 1, wherein the distributed computing environment is a cloud computing environment.

5. The computer implemented method of claim 1, wherein transition points are positioned between each layer of the distributed computing environment.

6. The computing implemented method of claim 5, wherein the transition points are positioned between each component in each layer of the distributed computing environment.

7. The computer-implemented method of claim 1, further comprising logging, by an event engine, a data transmission interruption event.

8. The computer-implemented method of claim 1, wherein performing the data transmission interruption further comprises generating a transaction integrity flag responsive to a match between additional identification information for the transaction in the respective transaction header.

9. The computer-implemented method of claim 1, further comprising asynchronously tracking the transactions to obtain response details to determine priority of processing in accordance with quality of service.

10. A system for preventing incidence of data swaps performed by a data swap microservice framework comprising:
- a hardware processor; and
- a memory that stores a computer program product, which, when executed by the hardware processor, causes the hardware processor to:
  - measure volume of transactions at transition points that include entry and exit points in distributed computing environment to determine multi-level locations for potential data swaps, wherein each of the transactions has a transaction header;
  - tag the transactions with a global user identification (GUID) in the respective transaction header;
  - record the entry and exit points from multi-level locations in the respective transaction header as correlation identifications (CID) for a thread identification (TID);
  - manage a correlation between the TID and the GUID in the respective transaction header for the transactions in the distributed computing environment by mapping the GUID, the TID, and the CID; and
  - perform a data transmission interruption to avoid data swaps at the multi-level locations for potential data swaps based on an exit policy when the CID, TID, and the GUID for the transaction in the respective transaction header do not match.

11. The system of claim 10, wherein a request for a transaction includes the GUID being generated and embedded in the respective transaction header.

12. The system of claim 10, wherein the locations for potential data swaps include the entry point and the exit point for the transaction that automatically checks for matching between the TID and the GUID in the respective transaction header.

13. The system of claim 10, wherein the distributed computing environment is a cloud computing environment.

14. The system of claim 10, wherein transition points are positioned between each layer of the distributed computing environment.

15. The system of claim 14, wherein the transition points are positioned between each component in each layer of the distributed computing environment.

16. A computer program product for preventing incidence of data swaps performed by a data swap microservice framework comprising a computer readable storage medium having computer readable program code embodied therewith, the program instructions executable by a processor to cause the processor to:
- measure, using the processor, volume of transactions at transition points that include entry and exit points in distributed computing environment to determine multi-level locations for potential data swaps, wherein each of the transactions has a transaction header;
- tag the transactions, using the processor, with a global user identification (GUID) in the respective transaction header;
- record, using the processor, the entry and exit points from the multi-level locations in the respective transaction header as correlation identifications (CID) for a thread identification (TID);
- manage, using the processor, a correlation between the TID and the GUID in the respective transaction header for the transactions in the distributed computing environment by mapping the GUID, the TID, and the CID; and
- perform, using the processor, a data transmission interruption to avoid data swaps at the multi-level locations for potential data swaps, based on an exit policy when the CID, the TID, and the GUID for the transactions in the respective transaction header do not match.

17. The computer program product of claim 16, wherein a request for a transaction includes the GUID being generated and embedded in the respective transaction header.

18. The computer program product of claim 16, wherein the locations for potential data swaps include the entry point and the exit point for the transaction that automatically checks for matching between the TID and the GUID in the respective transaction header.

19. The computer program product of claim 16, wherein the distributed computing environment is a cloud computing environment.

20. The computer program product of claim 16, wherein transition points are positioned between each layer of the distributed computing environment.

* * * * *